United States Patent
Xu et al.

(10) Patent No.: US 7,474,504 B2
(45) Date of Patent: Jan. 6, 2009

(54) MAGNETIC HEAD HEATING ELEMENT IN A DISK DRIVE

(75) Inventors: Junguo Xu, Tsuchiura (JP); Ryuji Tsuchiyama, Tsuchiura (JP); Mikio Tokuyama, Tsuchiura (JP); Masaaki Matsumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 11/256,965

(22) Filed: Oct. 25, 2005

(65) Prior Publication Data

US 2006/0039077 A1 Feb. 23, 2006

Related U.S. Application Data

(62) Division of application No. 10/168,858, filed on Jun. 26, 2002, now Pat. No. 6,963,464.

(30) Foreign Application Priority Data

Oct. 26, 2000 (JP) ............................. 2000-326391

(51) Int. Cl.
*G11B 5/00* (2006.01)
(52) U.S. Cl. .................................. 360/128
(58) Field of Classification Search .............. 360/128, 360/125.3, 125.31, 125.71, 125.74, 75
See application file for complete search history.

(56) References Cited

U.S. PATENT DOCUMENTS

| | | | |
|---|---|---|---|
| 3,928,995 A * | 12/1975 | Oldis et al. ................ 72/60 |
| 4,622,616 A * | 11/1986 | Isshiki ..................... 360/122 |
| 4,719,527 A * | 1/1988 | Yoshisato et al. .......... 360/121 |
| 5,373,495 A | 12/1994 | Takada |
| 5,880,899 A | 3/1999 | Blachek et al. ........... 360/66 |
| 5,928,549 A * | 7/1999 | Hitzigrath ................ 219/548 |
| 5,965,840 A | 10/1999 | Nagarajan et al. ......... 136/203 |
| 5,991,113 A | 11/1999 | Meyer et al. ............. 360/75 |
| 6,195,219 B1 | 2/2001 | Smith ..................... 360/66 |
| 6,278,091 B1 * | 8/2001 | Van Gooden ............. 219/528 |
| 6,282,061 B1 | 8/2001 | Kanda et al. |
| 6,441,982 B1 | 8/2002 | Fukushima et al. ....... 360/59 |
| 6,493,183 B1 | 12/2002 | Kasiraj et al. ............ 360/126 |
| 6,842,308 B1 * | 1/2005 | Pust et al. ............... 360/234.7 |
| 6,963,464 B2 * | 11/2005 | Xu et al. ................. 360/75 |
| 7,035,046 B1 * | 4/2006 | Young et al. ............ 360/125.75 |
| 7,095,587 B2 * | 8/2006 | Kurita et al. ............ 360/128 |
| 7,184,246 B2 * | 2/2007 | Sasaki et al. ............ 360/294.7 |
| 2003/0174430 A1 * | 9/2003 | Takahashi et al. ......... 360/75 |

FOREIGN PATENT DOCUMENTS

| JP | 49-27935 | 7/1974 |
|---|---|---|
| JP | 4-339308 | 11/1992 |
| JP | 04-339308 | 11/1992 |

(Continued)

*Primary Examiner*—Andrea L Wellington
*Assistant Examiner*—Matthew G Kayrish
(74) *Attorney, Agent, or Firm*—Antonelli, Terry, Stout & Kraus, LLP.

(57) ABSTRACT

A magnetic head slider including: a head element which records or reproduces information on a magnetic disk, a slider having said head element, and an electric conducting film in which paired first and second parts are formed to be substantially parallel, where current flows within said first and second parts are in the opposite direction as against said slider.

10 Claims, 12 Drawing Sheets

FOREIGN PATENT DOCUMENTS

| | | |
|---|---|---|
| JP | 05-020635 | 1/1993 |
| JP | 5-020635 | 1/1993 |
| JP | 05-026467 | 2/1993 |
| JP | 5-094682 | 4/1993 |
| JP | 5-101572 | 4/1993 |
| JP | 07-035359 | 2/1995 |
| JP | 8-221922 | 8/1996 |
| JP | 10-269527 | 10/1998 |

* cited by examiner

MAGNETIC HEAD HEATING ELEMENT IN A DISK DRIVE

CROSS REFERNCE TO RELATED APPLICATION

This is a divisional of U.S. application Ser. No. 10/168,858, filed Jun. 26, 2002, now U.S. Pat. No. 6,963,464 the entirety of the contents and subject matter of which is incorporated herein by reference.

TECHNICAL FIELD

The present invention relates to a floating type or sliding type magnetic head slider having a magnetic head for reading and writing information on a magnetic disk, and a magnetic disk device including the magnetic head slider.

BACKGROUND ART

In order to respond to the need for higher recording density of a magnetic disk device, it has been more necessary to reduce a flying height of a magnetic head slider (simply referred to it as a slider) in recent years. Meanwhile, the smaller a flying height of a slider, R/W (Read/Write) elements are more prone to collide with small protrusions, which are resulted from a rough surface of a magnetic disk. In recent years, a slider has had a small flying height of 30 nm or less relative to a magnetic disk, so that the probability of collision has increased between small protrusions on a surface of a magnetic disk and a magnetic head element (simply referred to it as a head element). In the case of a magnetoresistance effect type head, when a head element collides with small protrusions, the element generates heat and an abnormal signal appears due to thermal asperity (hereinafter, abbreviated as TA). Further, in general, a protective film made of carbon or the like is provided on a surface of a head element to prevent damage such as corrosion. When the protective film on the surface of the head element wears due to collision with small protrusions on a surface of the magnetic disk, the head element cannot be protected and damage such as corrosion is more likely to occur, resulting in shorter lifetime of the magnetic disk device.

JP-A-10-269527 specification discloses means for avoiding collision between small protrusions on a magnetic disk and an element so as to prevent an abnormal signal caused by thermal asperity (TA) on a magnetoresistance effect type head. The means can avoid collision by making a step such that a magnetic head element structure has a recessed part relative to a front slider in.

When a magnetic signal is recorded and reproduced, since current is applied to a magnetic head element, the head element generates heat and a temperature rises. Moreover, due to heat generated on a spindle motor or the like, a temperature rises entirely on a magnetic disk device. The temperature may increase to 60° C. On the other hand, in the head element part, the magnetic head element is generally formed by a nickel alloy and a cobalt alloy, and an insulating film is made of a ceramic such as alumina. The nickel alloy and the cobalt alloy are larger in thermal expansion coefficient than the ceramics of the insulating film. When a temperature rises, the element has a larger amount of thermal expansion than the ceramics of the insulating film. Thus, the element protrudes in a thickness direction of the slider, that is, in a direction of a disk surface.

Hereinafter, as one example a protruding amount of the element will be calculated. It is assumed that a material of the element is a Ni—Fe alloy and a linear thermal expansion coefficient $\delta l/l$ is set at $1.45 \times 10^{-5}$/K. The element is 0.05 mm in length in a thickness direction of the slider. The insulating film is made of alumina and has a linear thermal expansion coefficient $\delta l/l$ of $7.5 \times 10^{-6}$/K. Here, when it is assumed that a temperature increase is 20K and the element and alumina are expanded independently, a protruding amount $\delta l$ of the element is 7 nm ($=7.0 \times 10^{-6}$/K$\times 20 \times 0.05 \times 10^{6}$).

According to the technique disclosed in JP-A-10-269527 specification, in the case of a small step between the head element part and the front slider part, when a temperature rises largely, due to protrusion of the element that is caused by thermal expansion, for example, when the slider flies, the element part is disposed at the lowest floating point (the closest point to the disk surface). Hence, the element is more likely to collide with the small protrusions on the surface of the magnetic disk, resulting in an abnormal signal due to damage on the element and thermal asperity.

Moreover, in the case of a large step between the head element part and the front slider part, or in the case of use in the environment at low temperature (e.g., around 0° C.), a distance (magnetic spacing) between the head element and a magnetic medium is increased when the slider flies, resulting in inability to perform recording and reading.

An object of the present invention is in a magnetic head slider and a magnetic disk device using the same, to provide a magnetic disk device or a magnetic head slider which can prevent collision between a head element and small protrusions on a surface of a magnetic disk and can reduce damage and thermal asperity on the head element even when a temperature rises. Further, another object is to provide a magnetic disk device which can perform normal recording and reproducing in response to changes in ambient temperature such as a temperature in a magnetic disk device and an outside air temperature.

DISCLOSURE OF THE INVENTION

The above described object is attained by providing a magnetic head slider which has a magnetic head for writing or reading information on a magnetic disk and has a heat source around the magnetic head part or around elements in addition to writing/reading elements.

Namely, the above described object is attained by providing magnetic head elements which is supported on a rotating magnetic disk via a gap and records or reproduces information on the magnetic disk, and a magnetic head slider having a heat source for heating the magnetic head elements. Or the object is attained by providing a film for heating magnetic head elements for writing or reading information on a magnetic disk, and a magnetic head slider having a heat source for heating the film.

Further, the above described object is attained by providing a magnetic head slider which has magnetic head elements for writing or reading information on the magnetic disk and regulates deformation occurring due to changes in temperature of the magnetic head elements. Or the object is attained by providing magnetic head slider which has a film heating magnetic head elements for writing or reading information on the magnetic disk and regulates deformation occurring due to changes in temperature of the film.

Also, the above described object is attained by a magnetic disk device which has a rotating magnetic disk, a slider supported on the magnetic disk via a gap, a suspension for supporting the slider on the magnetic disk via a gap, and a carriage for movably supporting the supporting means on the magnetic disk. The slider comprises magnetic head elements for writing or reading information on the magnetic disk and a heat source for heating the magnetic head elements. The magnetic disk device comprises means for regulating heat generation of the heat source.

Further, the above described object is attained by providing a magnetic disk device which has a rotating magnetic disk, a slider supported on the magnetic disk via a gap, a suspension for supporting the slider on the magnetic disk via a gap, and a carriage for movably supporting the supporting means on the magnetic disk. The slider comprises a film heating magnetic head elements for writing or reading information on the magnetic disk, and a heat source for heating the film. The magnetic disk device comprises means for regulating heat generation of the heat source.

Further, the above described object is also attained by a magnetic head slider (magnetic head) which includes (a magnetic head for writing or reading information on a magnetic disk, the magnetic head having at least) a thermal expansion material disposed on the disk side from a central surface in a thickness direction of the slider.

DETAILED DESCRIPTION

Figure 1:
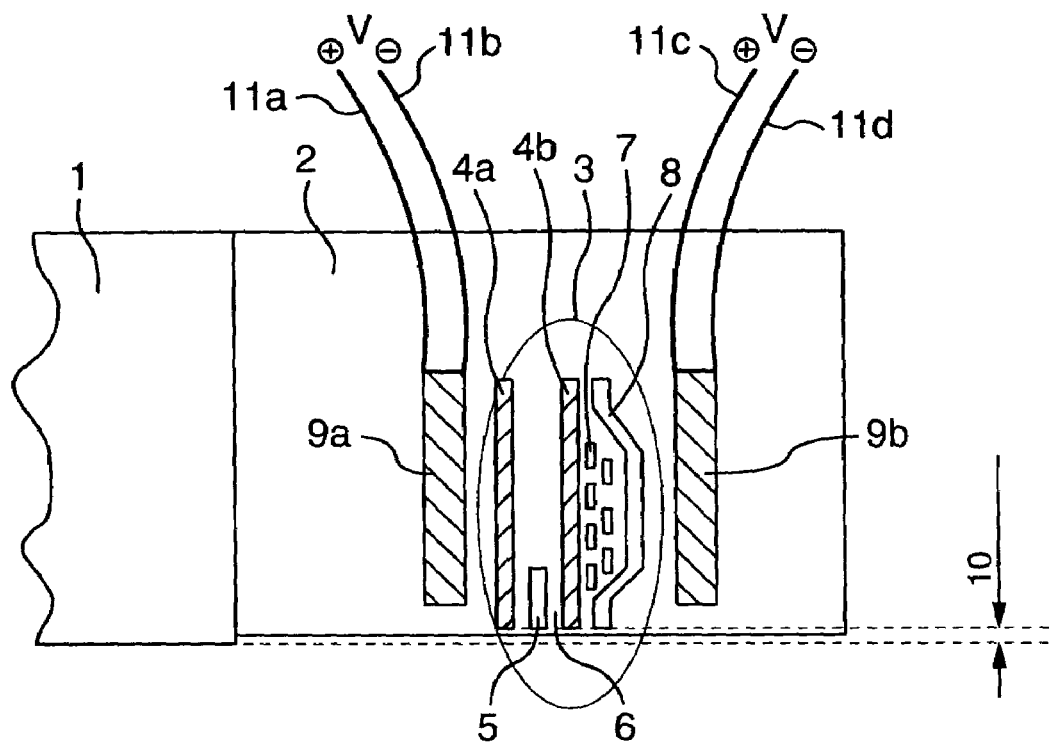
FIG. 1 is an enlarged view showing a magnetic head part of Embodiment 1 in a magnetic head slider of the present invention.
Figure 2:
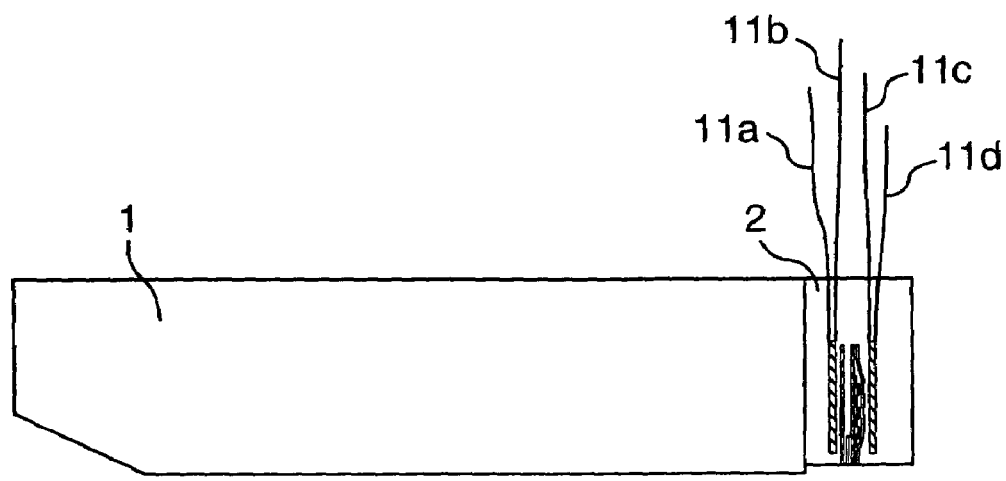
FIG. 2 is a side view showing the magnetic head slider of FIG. 1.

The following will discuss embodiments of the present invention referring to the drawings. Referring to FIGS. 1 to 4, Embodiment 1 of a magnetic head slider according to the present invention will be discussed by taking a magnetoresistance type head as an example. FIG. 1 is an enlarged side view showing a magnetic head, and FIG. 2 is a side view showing the magnetic head slider.

Figure 22:
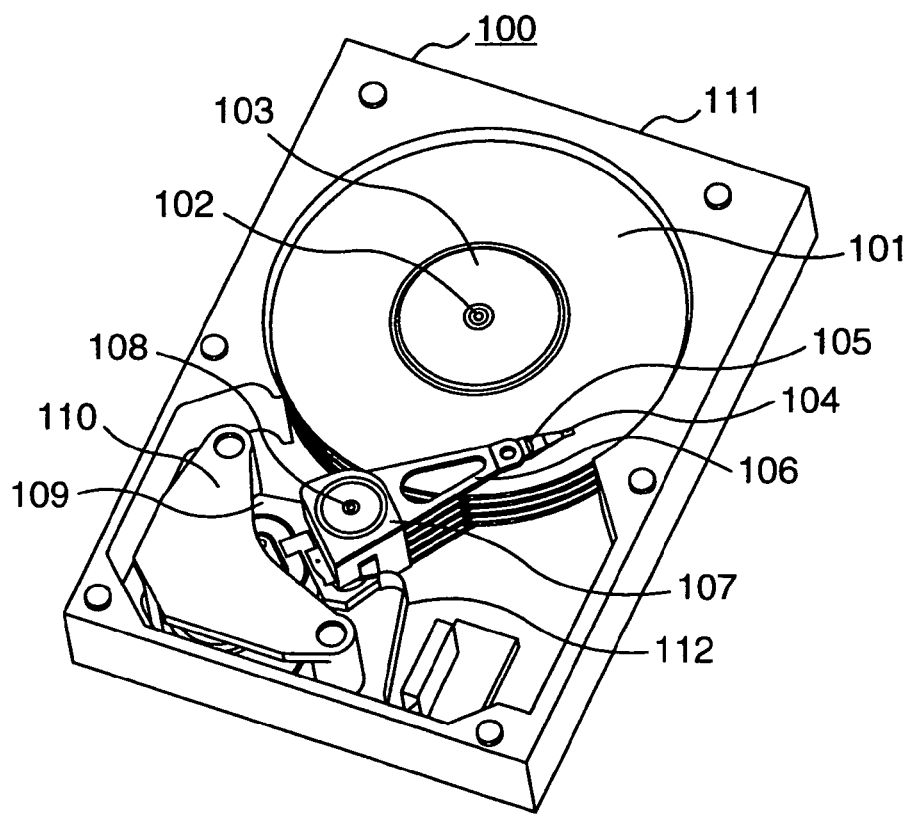
FIG. 22 is a perspective view schematically showing the configuration of a magnetic disk device according to the present invention.

Further, FIG. 22 schematically shows the configuration of a magnetic disk device according to the present invention. FIG. 22 is a perspective view showing a magnetic head device 100 having a magnetic head slider 104, which will be discussed below.

In a magnetic disk device 101, a hub 103 is driven and rotated around a rotary axis 102 by a spindle motor (not shown). A plurality of rotating magnetic disks 101 is attached to the hub 103 inside a casing (case) 111. The slider 104 positioned on a surface of the disk floats via a small gap due to the rotation of the magnetic disk 101 and is supported by a suspension 105.

At a tip end side of the suspension 105, a gimbal (flexure) part is provided such that the slider 104 can rotate longitudinally and laterally around the axis. The gimbal part is attached to the suspension 105 so as to support the slider 104.

The suspension 105 is attached to a carriage 106 at a basal side which is opposite from the slider 104, so that the suspension 105 is supported on the magnetic disk. The carriage 106 is attached so as to freely rotate around a pivot axis 108 of a pivot part 107, which is on the opposite side of the suspension. The suspension 105 and the slider 104 are positioned on the magnetic disk 101 due to electromagnetic force applied to a coil by a voice coil motor 110. The voice coil motor 110 includes a coil which is attached and supported on a coil bobbin 109 provided on the other side of the carriage 106 with the pivot 107 being disposed therebetween.

Information on the disk is written or read by the magnetic head mounded on the magnetic head slider 104, which is positioned on the magnetic disk 101, and a signal of the written/read information is transmitted to the outside of the magnetic head or the magnetic disk device through a signal line provided on a flexible print circuit (FPC).

The configuration of the present embodiment will be discussed below. A magnetic head 2 is mounted on an air flow-out end of a slider 1. A head element 3 is constituted by shield films 4a and 4b, a magnetoresistance type reading element 5, an insulating film 6, a coil 7, a magnetic core 8, or the like. Further, two electric conducting films 9a and 9b, which generate heat due to application of voltage through wiring 11a, 11b, 11c, and 11d, are formed substantially in parallel near the magnetic head part 2 or the element part 3 at a predetermined interval so as to sandwich the head element part 3. As a controlling method, when an ambient temperature is low or when the element has a low temperature, voltage or current is applied to the electric conducting films and heat is generated on the electric conducting films to maintain a fixed and proper temperature of the element. Moreover, when an ambient temperature is high or when a temperature of the element is increased by writing and reading, it is featured that voltage or current applied to the electric conducting films is reduced to maintain a proper temperature of the element.

Here, a surface of the slider 1 that opposes the disk is different in height from a surface of the head element 3 that opposes a disk. The difference is referred to as machining step (PTR) 10. The machining step occurs when a floating surface is polished. Since the head element 3 is lower in hardness than the slider 1, polishing is made more frequently thereon and grows more concave than the surface of the slider 1.

In the present embodiment, it is not always necessary to provide two electric conducting films, so that a single film may be also applicable. Besides, two or more electric conducting films may be provided for making a temperature uniform on the element part.

Also, regarding a material of the electric conducting films, a material such as metal and semiconductor is applicable as long as heat can be generated by applying voltage. For example, a nickel alloy and a cobalt alloy can be selected. Further, electrical resistance of the electric conducting films can be selected as necessary. For example, a resistance can be set at 10Ω.

Figure 3:
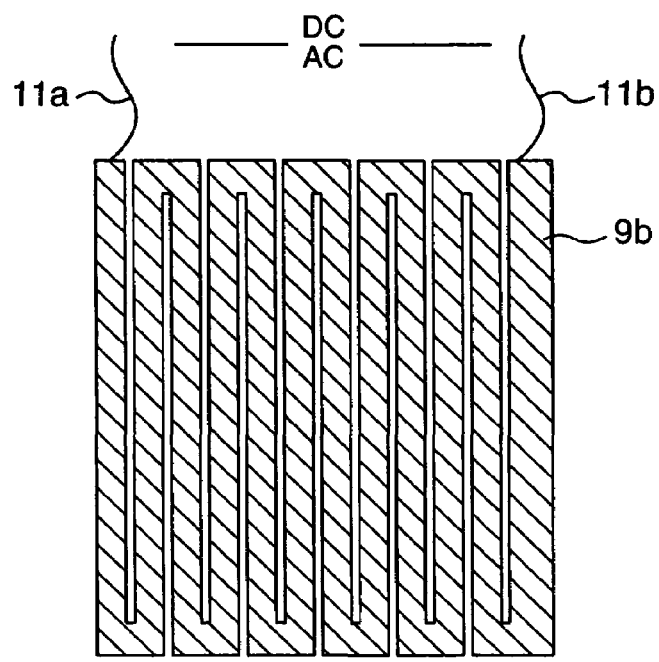
FIG. 3 is a diagram showing an example of an electric conducting film of the magnetic head slider shown in FIG. 1.

Besides, the size of the electric conducting films 9a and 9b is set such that the films can be disposed in the magnetic head 2. For example, a thickness is 10 to 50 μm, a width is larger than that of the element, and a length in a thickness direction of the slider is equal to that of the element. In addition, although the present embodiment employs the electric conducting films, lumps or lines made of an electric conductive material are also applicable. In short, any type of material can be used as long as heat is generated to allow the element to increase in temperature due to an applied voltage. For example, as shown in FIG. 3, a slim and continuous structure may be adopted. Moreover, it is desirable that the electric conducting films are configured without causing a magnetic field not interfering with writing and reading when voltage is applied.

Besides, in the present embodiment, the electric conducting films 9a and 9b are disposed at the front and the rear of the head element along the length of the slider. However, the electric conducting films 9a and 9b may be disposed on the right and left in a width direction of the slider. In short, any configuration is applicable as long as heat can be supplied sufficiently to increase a temperature of the element to a predetermined temperature due to applied voltage.

Figure 4:
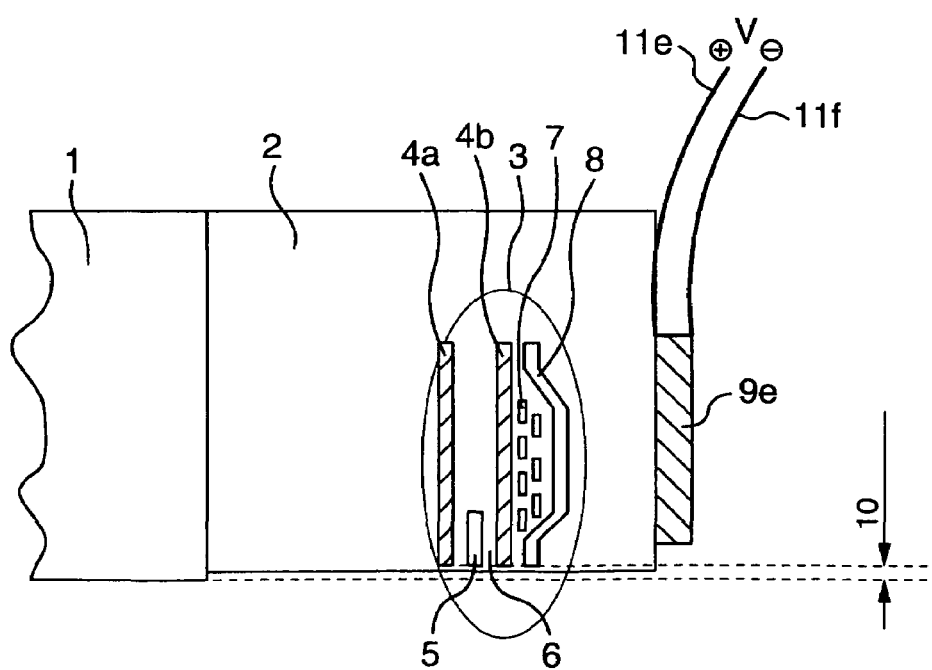
FIG. 4 is a diagram showing the electric conducting film bonded to the rear of the head in a traveling direction of the slider.
Figure 5:
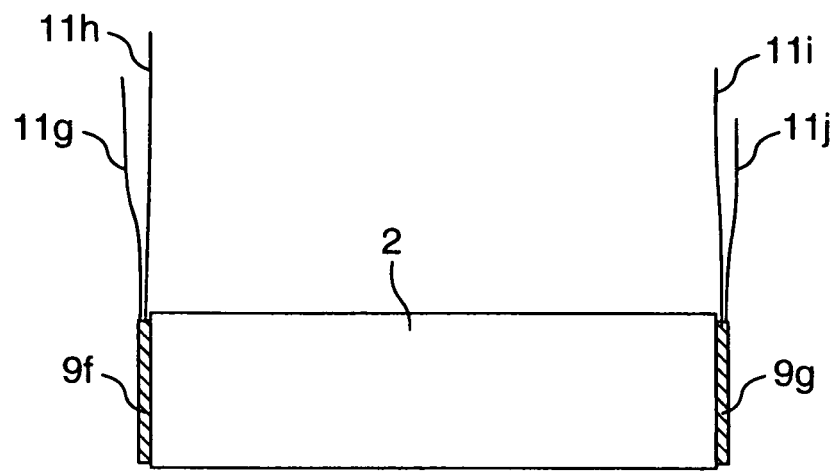
FIG. 5 is a diagram taken from the rear of the head in a traveling direction of the slider.

In FIG. 1 of the present embodiment, the electric conducting films are embedded into the magnetic head. However, as shown in FIG. 4, an electric conducting film 9e may be bonded to the rear end part of the head 2. Additionally, as shown in FIG. 5, electric conducting films 9f and 9g may be bonded to both sides of the head 2 that correspond to both of end faces of the slider 1 in a width direction.

Next, referring to FIGS. 6 to 9, the effect of the present embodiment will be discussed below.

Figure 6:
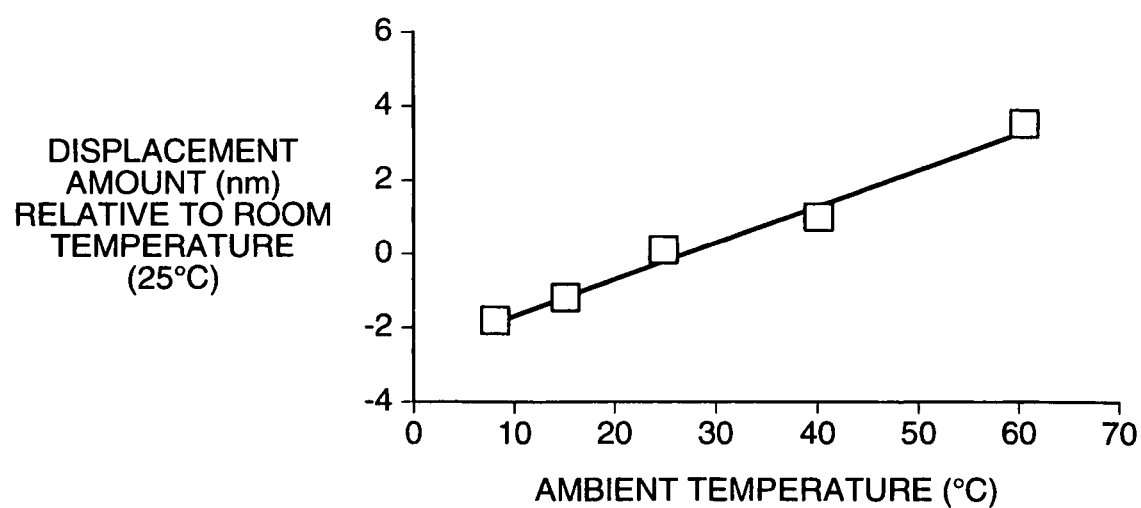
FIG. 6 shows an example of displacement measurements of a head element relative to changes in ambient temperature when the electric conducting film is not formed.

FIG. 6 shows an example of measurement results of deformation amounts on the head element 3 (in a thickness direction of the slider) relative to a disk surface. The measurement was made while an ambient temperature is changed on a conventional magnetic head slider where no electric conducting film is formed. Displacement amounts shown in FIG. 6 were standardized relative to an ambient temperature of 5° C. As shown in FIG. 6, it is found that when an ambient temperature is changed from 8 to 60° C., a displacement amount of the head element (protrusion volume in the disk surface direction) reaches 5 nm or more.

Figure 7:
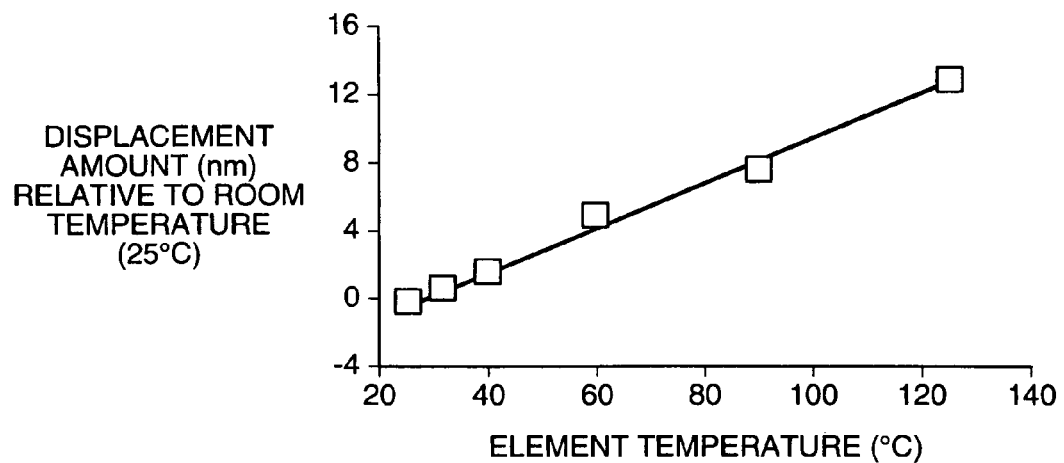
FIG. 7 shows an example of displacement measurements of the head element when power is supplied to a light coil when the electric conducting film is not formed.

FIG. 7 shows an example of measurement results of deformation amounts on the head element 3 protruding in the disk surface direction. The measurement was made while a temperature of the head element is changed by applying power to a coil of a write head in the conventional magnetic head slider where no electric conducting film is formed. As shown in FIG. 7, it is understood that when a temperature of the magnetic head element is changed in the range from 25 to 125° C., a deformation amount of the head element reaches 13 nm or more.

Figure 8:
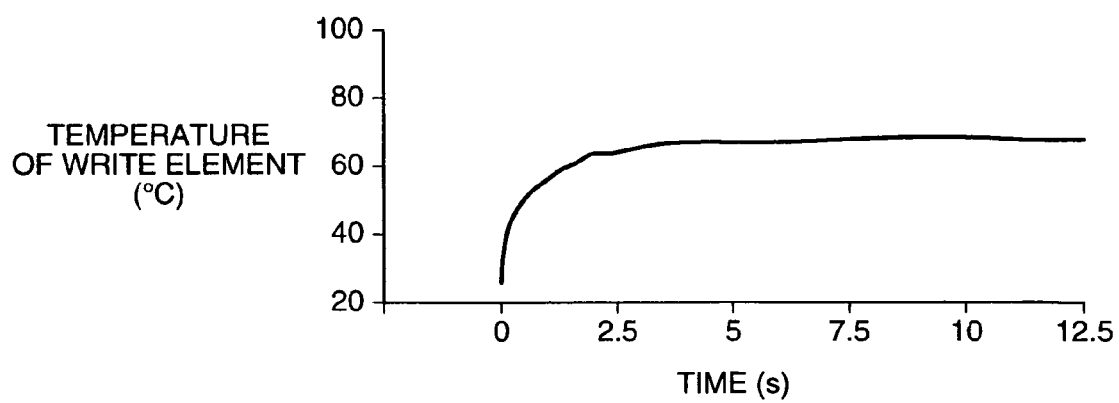
FIG. 8 is a diagram showing changes in temperature of the head elements with time when direct current of 40 mA is applied to the light coil.

FIG. 8 shows changes with time in temperature of the head element when direct current of 40 mA is applied to the write coil. About 1 sec is necessary from application of current to when the head element increases in temperature to a fixed value.

As shown in FIGS. 6 and 7, in the case of the conventional magnetic head where the electric conducting films 9a and 9b are not formed, when a temperature is low (e.g., just after the start of recording), since the magnetic head element is made concave, spacing is increased between the magnetic head element and the writing medium, so that inability to write may arise. For example, as shown in FIG. 8, assuming that inability to write continues for 1 sec until the head element increases in temperature, a writing speed normally ranges from several MHz ($10^6$) to several hundreds MHz. Thus, 1 sec-inability to record and reproduce is equivalent to loss of several mega pieces or several hundreds mega pieces of data.

Figure 9:
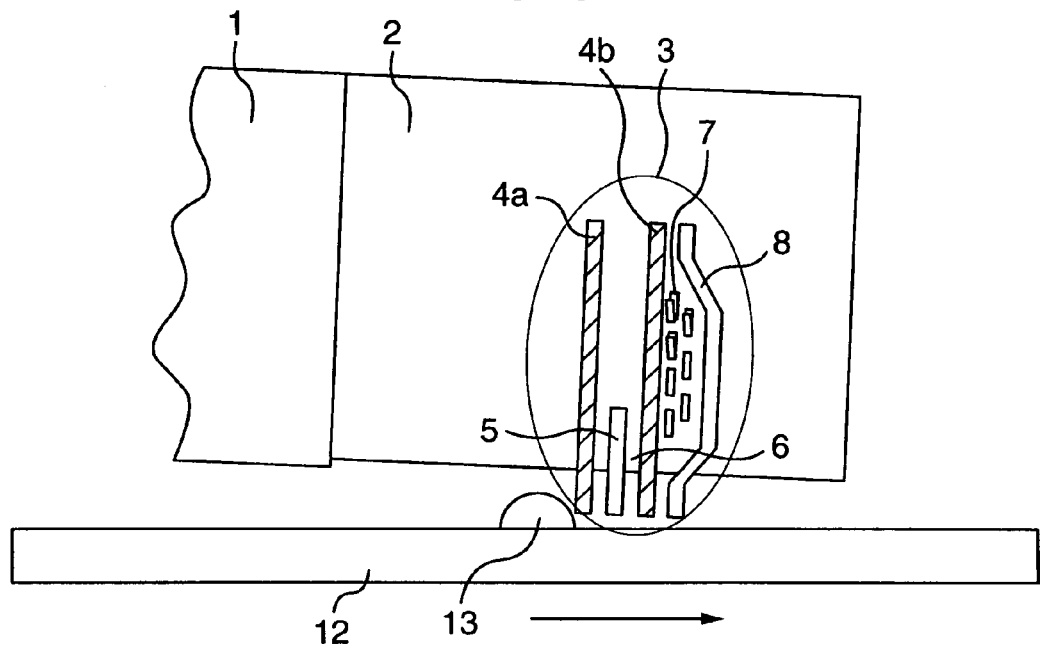
FIG. 9 is a diagram showing a state in which magnetic head elements protruded by heat collides with a small protrusion on a surface of a magnetic disk.

Further, when the head element part 3 has a high temperature due to an increase in ambient temperature or heat generated on the element itself, the head element approaches to the disk surface as shown in FIG. 9. When a machining step (PTR) is small, since protrusion is made toward the magnetic disk, the protruded head element collides with a small protrusion 13 on a surface of the magnetic disk, the head element may be damaged, or an abnormal signal may occur due to the formation of thermal asperity. Namely, within a range of an ambient temperature of the head element, a fixed magnetic spacing may not be maintained, a writing/reading error may occur at low temperature, and damage and thermal asperity may occur on the element at high temperature.

In Embodiment 1, the magnetic head 2 is mounted on the air flow-out end of the slider 1. The head element part 3 is constituted by shield films 4a and 4b, a magnetoresistance type reading element 5, the insulating film 6, the coil 7, a magnetic core 8, or the like. Further, two electric conducting films 9a and 9b, which generate heat due to application of voltage through the wiring 11a, 11b, 11c, and 11d, are formed substantially in parallel near the magnetic head part 2 or near the element part 3 at a predetermined interval so as to sandwich the head element part 3. As a method of controlling a heating volume of the electric conducting films 9a and 9b, when the element has a low temperature, voltage or current is applied to the electric conducting films and heat is generated on the electric conducting films to maintain a fixed and proper temperature of the element. Thus, a proper and fixed spacing can be maintained between the element and the writing medium, thereby preventing a writing/reading error at low temperature. Moreover, when an ambient temperature is high or when a temperature of the element is increased by writing and reading, voltage or current applied to the electric conducting films is reduced to maintain a fixed and proper temperature of the element. Hence, it is possible to maintain a proper and fixed spacing between the element and the writing medium, so that the head element does not collide with the small protrusion on the surface of the magnetic disk. Thus, it is possible to prevent damage on the head element and an abnormal signal resulted from the formation of thermal asperity.

Figure 10:
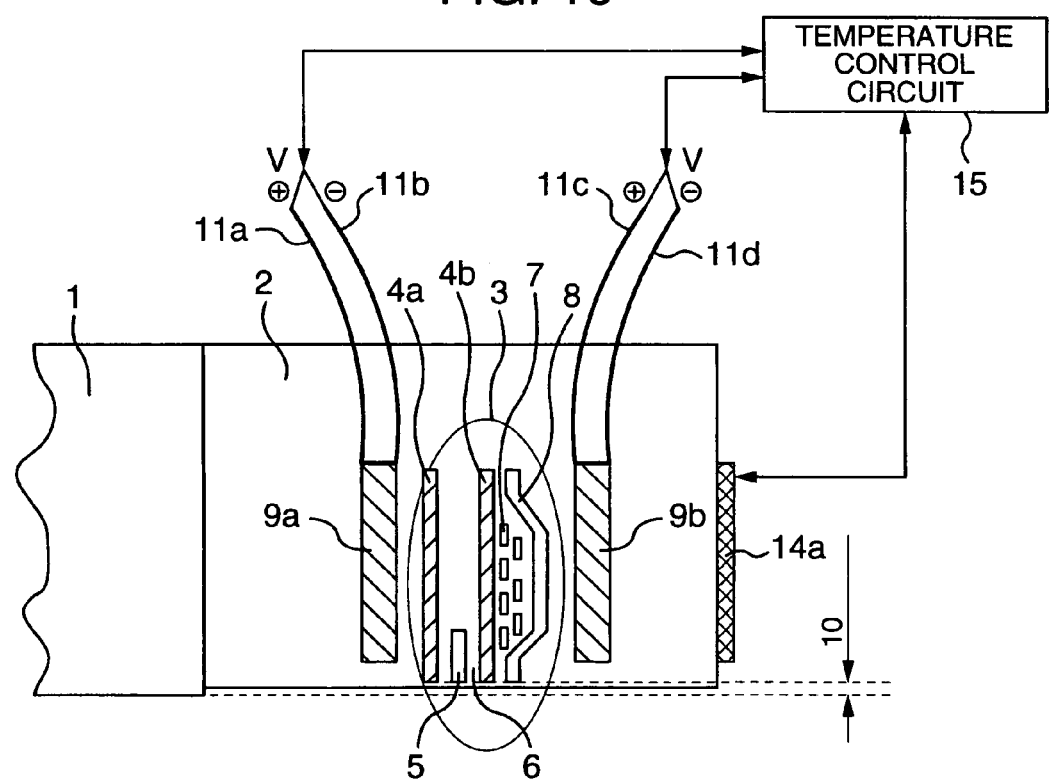
FIG. 10 is a side view showing a magnetic head part having a temperature sensor bonded to the rear of the head.
Figure 11:
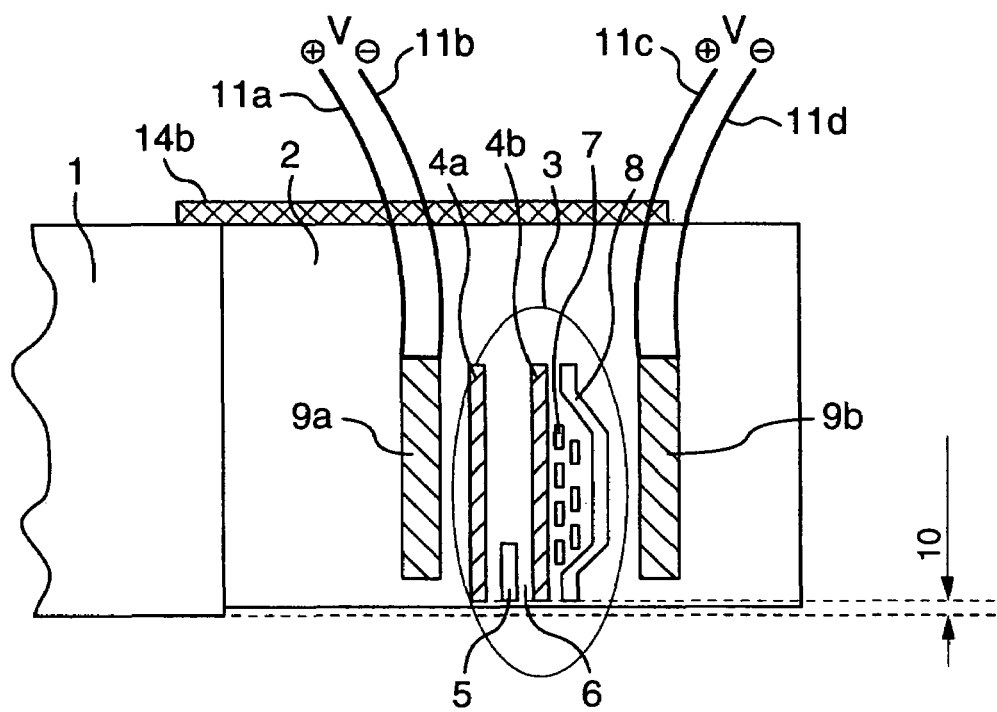
FIG. 11 is a side view showing a magnetic head part having a temperature sensor bonded to the back of the head.
Figure 12:
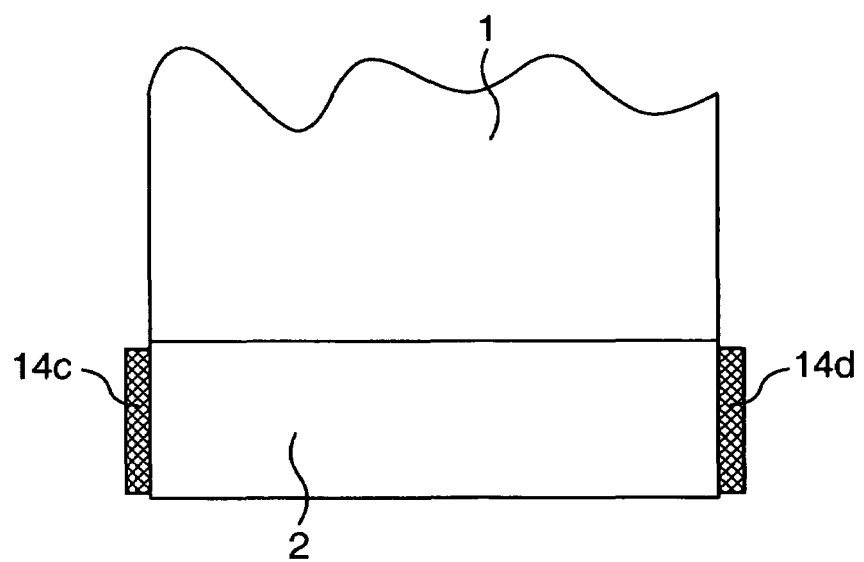
FIG. 12 is a diagram taken from the back of a magnetic head part having temperature sensors bonded to the side of the head.

Referring to FIGS. 10 to 12, a magnetic head slider according to Embodiment 2 of the present invention will be discussed. FIG. 10 is a side view showing a magnetic head part having a temperature sensor bonded to the rear of the head. FIG. 11 is a side view showing the magnetic head part having a temperature sensor bonded to the back of the head. FIG. 12 is a drawing taken from the back of the magnetic head part having temperature sensors bonded to the side of the head.

The configuration of the present embodiment will be discussed. According to the present embodiment, in the configuration of Embodiment 1 of the present invention, a temperature sensor 14a is further provided on the rear of the magnetic head and a control circuit 15 is provided which uses the temperature sensor to control voltage or current applied to the electric conducting films so as to control a temperature of the head element part 3.

Besides, in the present embodiment, as shown in FIG. 11, a temperature sensor 14b may be provided on the back of the magnetic head, or as shown in FIG. 12, temperature sensors 14b and 14c may be provided on the sides of the magnetic head. Moreover, as to a position for providing the temperature sensor, the neighborhood of the head 2 or the element 3 is desirable. However, the temperature sensor may be provided on the slider 1. Additionally, regarding a method of attaching the sensor, the sensor may be bonded, a thin film may be evaporated, or the sensor may be embedded into the head.

Next, the operation of the present embodiment will be discussed below. In the case of the present embodiment, the temperature sensor 14a and the temperature control circuit 15 are provided in addition to Embodiment 1. Hence, it is possible to control voltage or current applied to the electric conducting films 9a and 9b by feedback control and to control a temperature of the head element while a temperature of the head element 3 is always monitored, and it is possible to prevent a writing/reading error, which is caused by a large magnetic spacing between the element and the writing medium at low temperature, and damage on the element and thermal asperity that are caused by a small magnetic spacing between the element and the writing medium at high temperature. To be specific, when the magnetic head element has a low temperature, a voltage (current) is applied to the electric conducting films 9a and 9b, and the application of the voltage (current) is stopped when the magnetic head element has a high temperature. As described above, in the present embodiment, feedback on temperature can be provided by the temperature sensor. Hence, as compared with Embodiment 1, there is an advantage that it is possible to more accurately control a position of the element.

Figure 13:
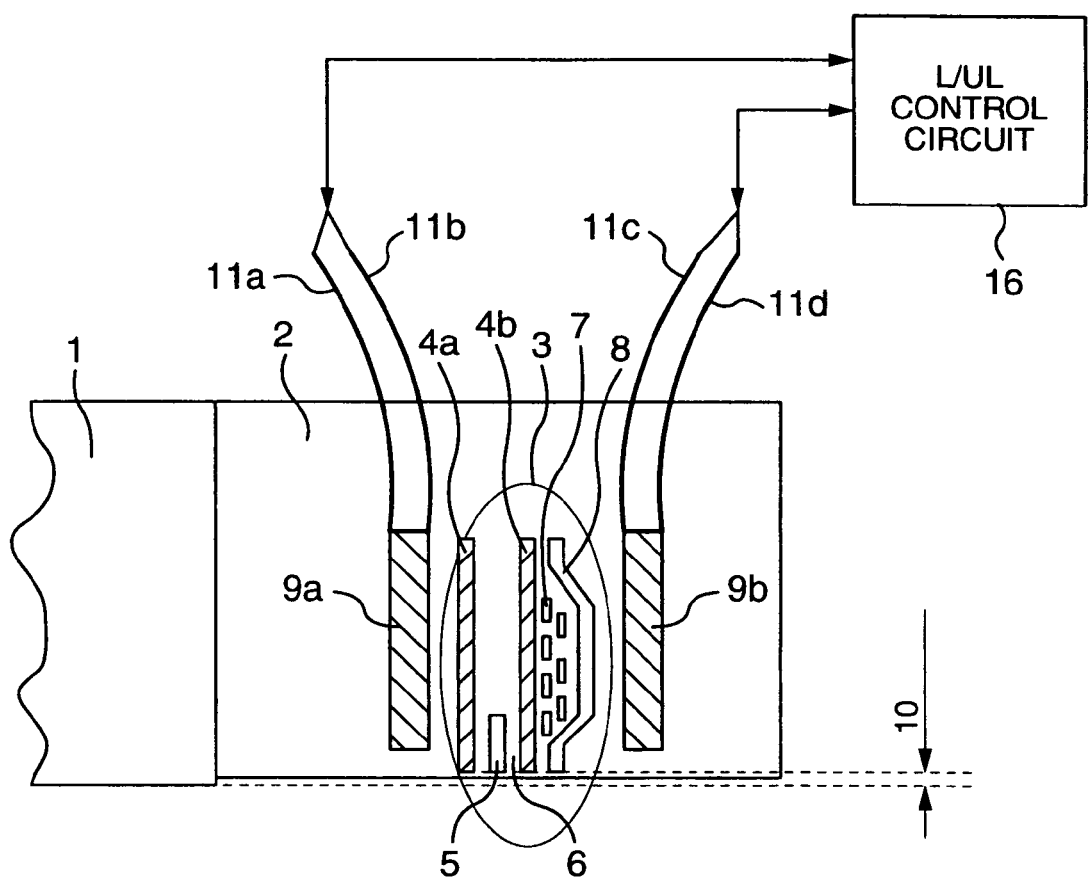
FIG. 13 is a side view showing a magnetic head part having electric conducting films connected to a load/unload control circuit.
Figure 14:
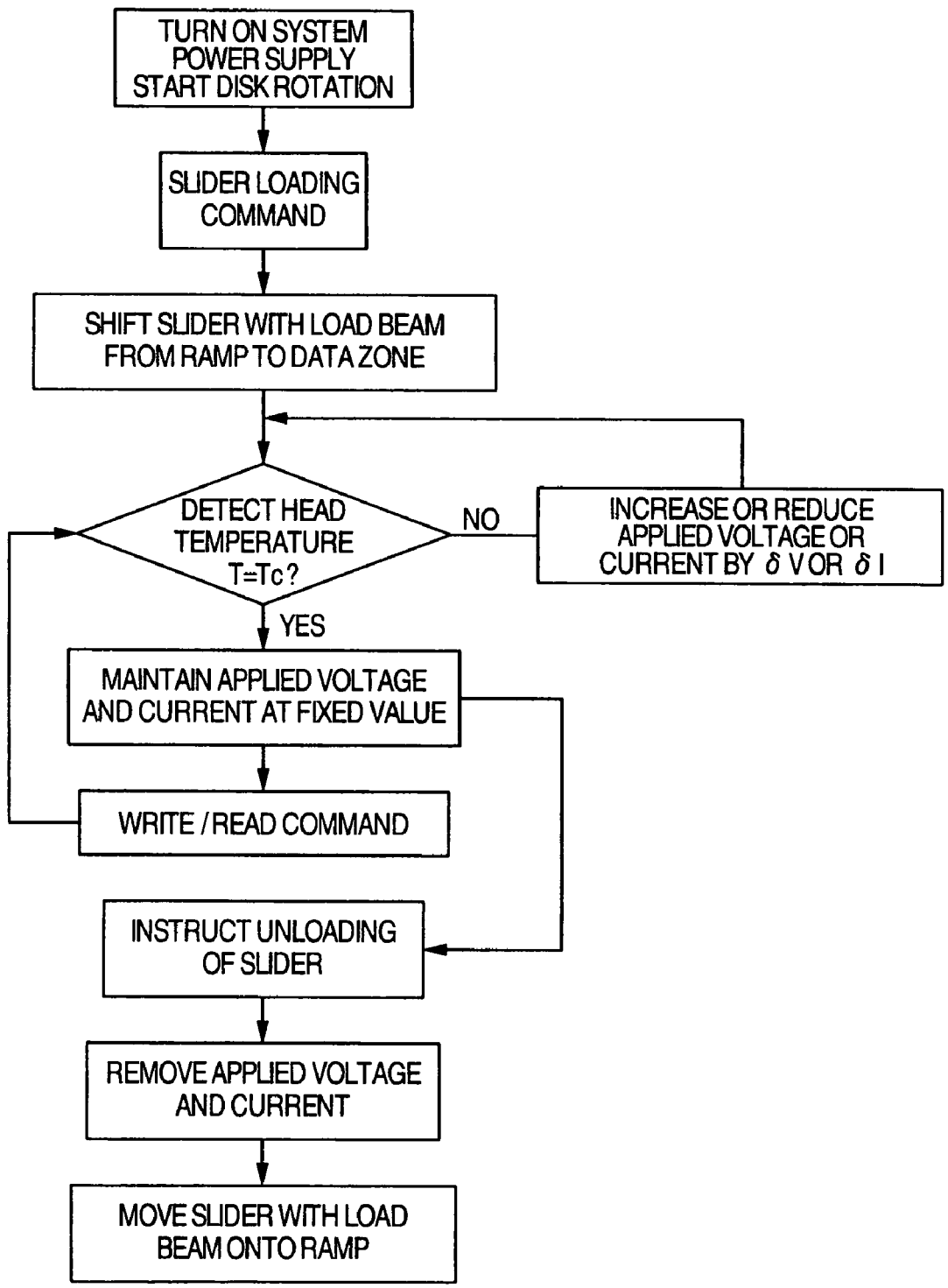
FIG. 14 is a flowchart diagram showing loading/unloading control of the slider.

Referring to FIGS. 13 and 14, a magnetic head slider according to Embodiment 3 of the present invention will he discussed. FIG. 13 is a side view showing the magnetic head part having electric conducting films connected to a load/unload (L/UL) control circuit. FIG. 14 is a flowchart showing load/unload control.

The configuration of the present embodiment will be discussed below. The present embodiment is identical to Embodiment 1 of the present invention in configuration of a head. The head is configured such that the head element 3 has a machining step (PTR) when current is not applied to the head element 3 or the electric conducting films 9a and 9b. Further, the present embodiment has the load/unload mechanism, and application of voltage or current to the electric conducting films is controlled by an operation command of load/unload control of the magnetic head slider 1. To be specific, a control circuit 16 is provided which reduces voltage or current applied to the electric conducting films 9a and 9b or stops the application when the magnetic head slider 1 is loaded or unloaded.

The operation of the present embodiment will be discussed below. The present embodiment is characterized in that a load/unload (L/UL) circuit is provided in addition to Embodiment 1 and heat generated on the electric conducting films is controlled in response to the circuit. (Since the temperature sensor 14a and the temperature control circuit 15 are provided, a voltage or a current applied to the electric conducting films 9a and 9b can be controlled by feedback control and a temperature of the head element can be controlled while a temperature of the head element 3 is always monitored, so that it is possible to prevent a writing/reading error caused by a large magnetic spacing at low temperature between the element and a writing medium and damage on the element and thermal asperity that are caused by a small magnetic spacing at high temperature between the element and the writing medium.)

Further, a control circuit 16 is provided, which controls application of voltage or current to the electric conducting films by an operation command of load/unload control of the magnetic head slider 1 and reduces voltage or current supplied to the electric conducting films 9a and 9b or stops the application when the magnetic head slider 1 is loaded or unloaded. Hence, when the slider is loaded or unloaded, the head element has small thermal expansion and a machining step (PTR) can be maintained. Thus, the head element is not brought into contact with a disk surface upon loading/unloading, thereby preventing damage on the element. As an example, FIG. 14 shows a flowchart of load/unload control of the slider. As shown in FIG. 14, when loading/unloading of the slider is controlled, the head element and the disk are not in contact with each other upon loading and unloading, thereby preventing damage on the head element.

It is desirable that an initial machining step (PTR) may be set such that the head element 3 does not protrude at the highest ambient temperature. Although the highest ambient temperature of the head element part is varied depending upon the working environment of a magnetic disk device, heat generated by a spindle motor, the specification of the head element itself or the like, the highest ambient temperature generally ranges from 40 to 80° C. Thus, as shown in FIG. 6 or 7, it is desirable to set an initial PTR at 2 to 7 nm on the basis of room temperature (25° C.).

Figure 15:
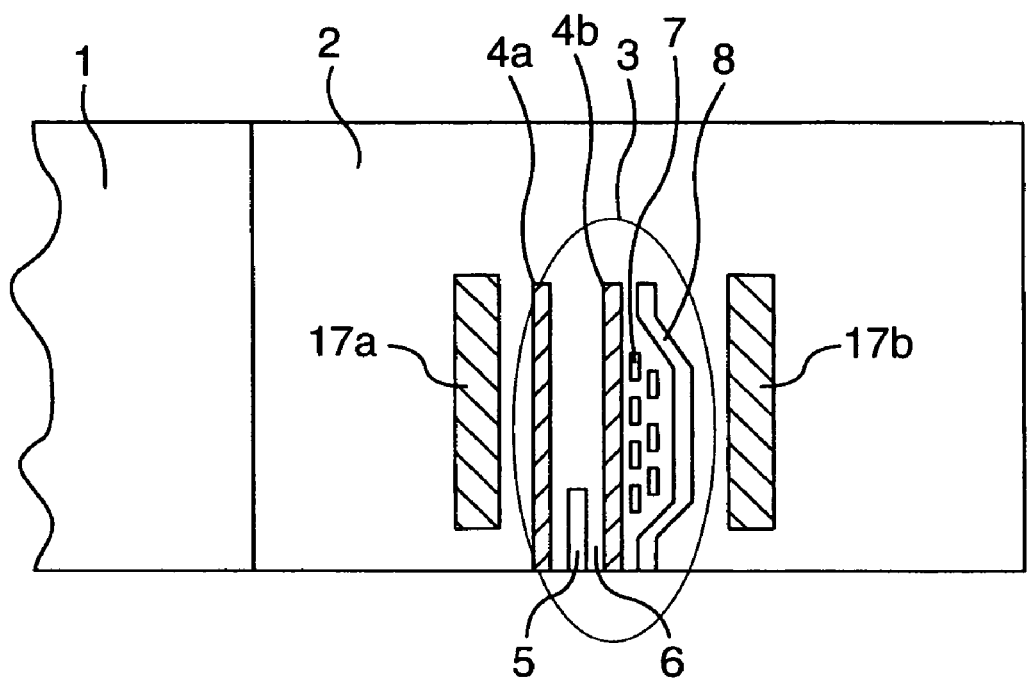
FIG. 15 is an enlarged view showing a magnetic head part of another embodiment in the magnetic head slider of the present invention.
Figure 16:
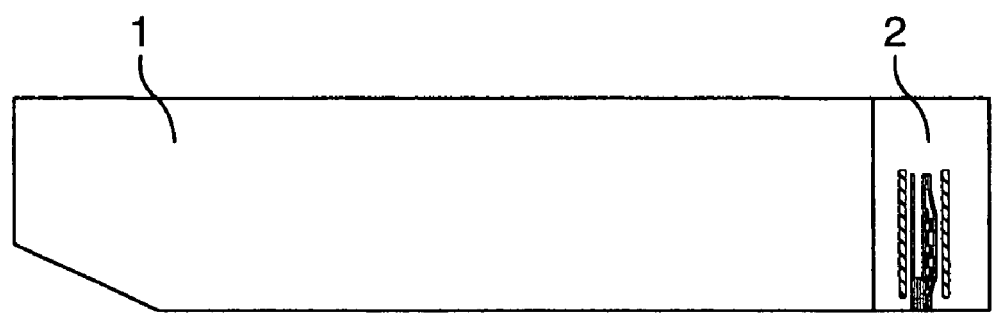
FIG. 16 is a side view showing the magnetic head slider of FIG. 15.

Referring to FIGS. 15 and 16, a magnetic head slider according to Embodiment 4 of the present invention will be discussed. FIG. 15 is an enlarged side view showing a magnetic head part, and FIG. 16 is a side view showing the magnetic head slider.

The configuration of the present embodiment will be discussed below. A magnetic head 2 is mounted on an air flow-out end of a slider 1. A head element part 3 is constituted by shield films 4a and 4b, a magnetoresistance type reading element 5, an insulating film 6, a coil 7, a magnetic core 8, or the like. Further, two thermal expansion films 17a and 17b are formed substantially in parallel in a thickness direction of the magnetic head 2 or the slider 1 at a predetermined interval so as to sandwich the head element part 3. The thermal expansion films 17a and 17b preferably have at least main parts disposed below a central surface of a thickness of the magnetic head 2 or the slider 1, that is, at the side of the magnetic disk.

Regarding a material of the thermal expansion films, for example, in the case of a nickel alloy, in which an element material has a linear expansion coefficient $\delta l/l$ of $1.45 \times 10^{-5}$/K, it is possible to select a nickel alloy ($\delta l/l$ is about $1.45 \times 10^{-5}$/K) and a cobalt alloy ($\delta l/l$ is about $1.4 \times 10^{-5}$/K) that are equal to the element in linear expansion coefficient. Further, as an example of the size of the thermal expansion films 17a and 17b, it is preferable that a thickness is set at 10 to 50 μm, a width is larger than that of the element, and a length in the slider thickness direction is equal to that of the element. In addition, although the films are provided in the present embodiment, lumps made of a thermal expansion material are also applicable. In short, any type of material can be used as long as the magnetic head 2 can be deformed by thermal expansion in the disk surface direction.

Figure 17:
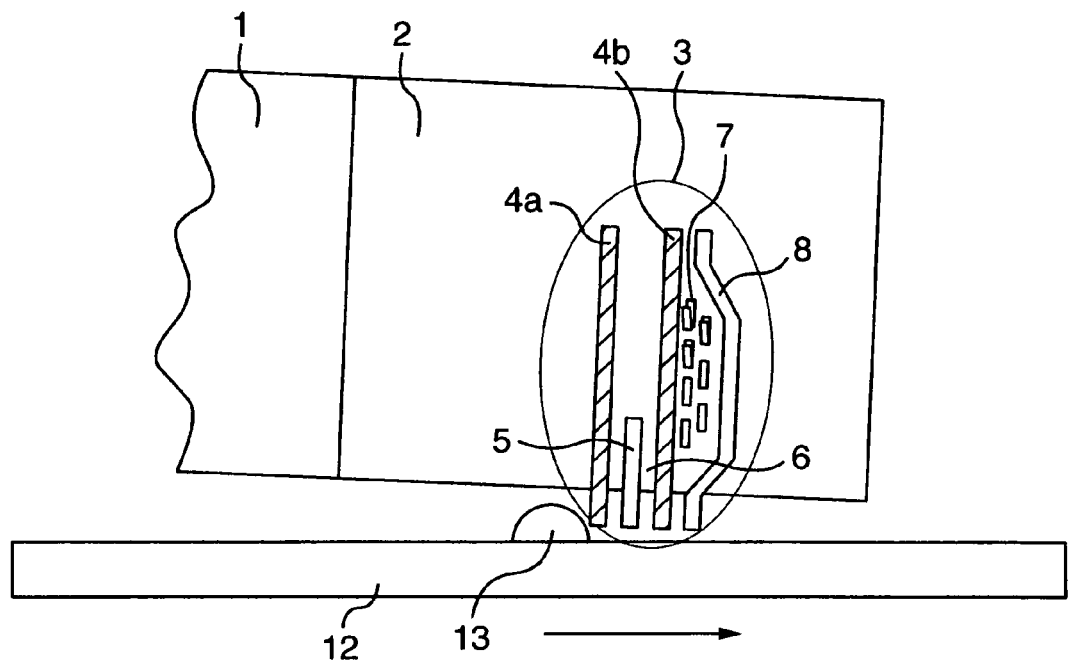
FIG. 17 is a conceptual illustration showing the head element protruding to a magnetic disk 1 due to thermal expansion.

Next, referring to FIGS. 17 and 18, the effect of the present embodiment will be discussed. As shown in FIG. 17, in the case of the magnetic head where the thermal expansion films 17a and 17b are not formed, because of heat generated on the element or a temperature increase of the head element itself, the head element protrudes toward the magnetic disk 10 due to thermal expansion. The protruded head element collides with a small protrusion 11 on the surface of the magnetic disk, so that the head element is damaged or an abnormal signal appears due to the formation of thermal asperity.

Figure 18:
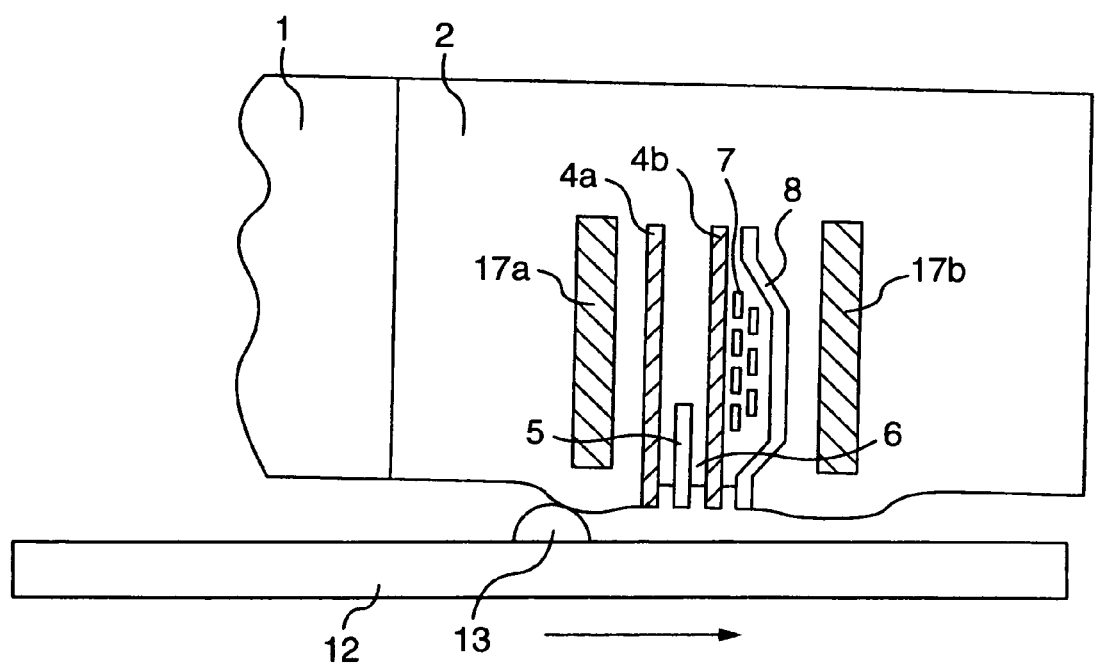
FIG. 18 is an explanatory drawing showing the effect of a thermal expansion film in the magnetic head slider of FIG. 15.

As shown in FIG. 18, the thermal expansion films 17a and 17b are formed in the present embodiment. Thus, due to a temperature increase on the magnetic head 2 or heat generated on the head element itself, the thermal expansion films are expanded together with the head element, resulting in deformation around the head element part. Therefore, the head element does not relatively protrude toward the magnetic disk, thereby avoiding direct collision between the head element and the small protrusion on the surface of the magnetic disk. Thus, it is possible to prevent damage on the head element and an abnormal signal caused by the formation of thermal asperity.

Figure 19:
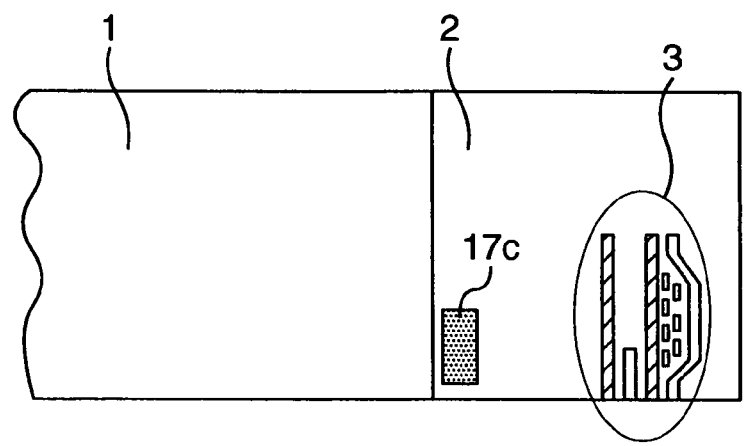
FIG. 19 is an enlarged view showing a magnetic head part of another embodiment in the magnetic head slider according to the present invention.
Figure 20:
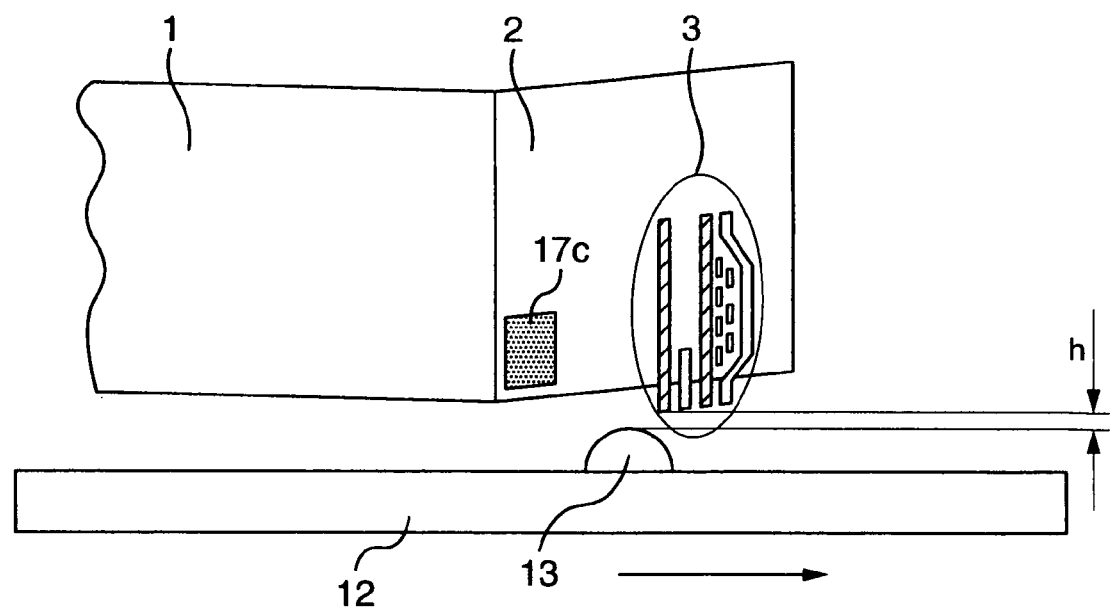
FIG. 20 is an explanatory drawing showing the effect of a thermal expansion film of FIG. 19 of the present invention.
Figure 21:
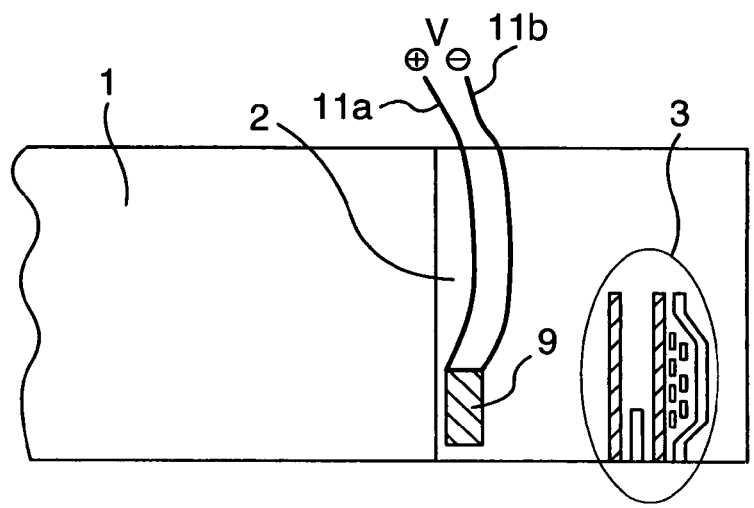
FIG. 21 is an enlarged view showing a magnetic head part of another embodiment in the magnetic head slider according to the present invention.

Referring to FIGS. 19 and 20, Embodiment 5 of the present invention will be discussed by taking a magnetoresistance type head as an example. In FIG. 19, since the configuration of a magnetic head 2 is identical to that of Embodiment 1, the explanation thereof is omitted. At the side of the slider from a head element part 3, a thermal expansion film 17c is formed on the side of a disk 10 from a central surface of a thickness of the slider or the magnetic head substantially in parallel at a predetermined interval from the head element part 3.

Next, referring to FIG. 20, the operation of the present embodiment will be discussed. In the case of the present embodiment, even when the head element is subjected to thermal expansion due to a temperature increase on the magnetic head and the head element protrudes to the magnetic disk, the thermal expansion film 17c formed adjacent to the slider is also subjected to thermal expansion, and the rear of the thermal expansion film is bent in a direction of moving away from the disk 10. Thus, it is possible to maintain a spacing between the head element part 3 and the protrusion 11 on the disk 10, thereby avoiding collision between the head element and the small protrusion. For this reason, it is possible to prevent an abnormal signal resulted from damage on the elements and the formation of thermal asperity.

By selecting a material of the thermal expansion film 17 and adjusting the size and the forming position of the thermal expansion film 17, a deformation amount of the magnetic head 2 due to heat can be adjusted as necessary. As an example, the following case will be discussed: an element material is a Ni—Fe alloy with a linear thermal expansion coefficient $\delta l/l$ of $1.45 \times 10^{-5}$/K, the head element is 0.05 mm in length in a thickness direction of the slider, and an insulation film is made of alumina with a linear thermal expansion coefficient $\delta l/l$ of $7.5 \times 10^{-6}$/K. When a temperature is increased by is 20K, it was determined by calculation that the element has a protrusion amount $\delta l$ of 7 nm. Thus, in order to make deformation equal to a protrusion amount of the element, a pico slider with a slider thickness of 0.3 mm is preferably adopted. Besides, when a thermal expansion film whose thermal expansion coefficient $\delta l/l$ is $2.9 \times 10^{-5}$/K is adopted, the thermal expansion film may be set at 0.05 mm in thickness and a distance may be set at 0.15 mm between the thermal expansion film and the element.

Next, referring to FIG. 22, a magnetic head slider according to another embodiment of the present invention will be discussed. Since the configuration of a head element part 3 is identical to that of above described Embodiment 1, the explanation thereof is omitted. Close to the side of a slider 1 from a head element part 3, a thermal expansion film 9 is formed at a predetermined interval from the head element part 3 substantially in parallel in the magnetic disk surface direction of the slider on the side of the disk 12 from a central line of a thickness of the slider. Further, electric conduction lines 14a and 14b or electric conductive films are provided for applying voltage to the thermal expansion film 9. A temperature of the thermal expansion film can be controlled by applying voltage.

In the present embodiment, the thermal expansion film is disposed inside a magnetic head film member 2 where the magnetic head element 3 is formed, and the thermal expansion film is disposed near the element. Furthermore, the thermal expansion film 9 is disposed along a joint surface of the magnetic head film member 2 and the slider body 1.

The operation of the present embodiment will be discussed below. Regarding the effect of preventing damage on the head element and thermal asperity by thermal expansion of the thermal expansion film 9, the present embodiment is identical to the above described examples, so that the explanation thereof is omitted. However, by adjusting voltage applied to the thermal expansion film 9, expansion of the thermal expansion film can be adjusted to a quantity suitable for preventing damage on the element. For example, a controlling method similar to that of Embodiment 5 may be adopted.

Moreover, the thermal expansion film 9 is provided along the joint surface of the magnetic head (film) 2 and the slider body 1, and the magnetic head element part 3 is disposed on the side of the rear end (the side of an air flow-out end) of the slider of the expansion film 9. Additionally, since the thermal expansion film 9 is disposed near the magnetic disk in a thickness direction of the slider, it is possible to readily adjust a protrusion amount of the head element 3 and to largely deform the magnetic head film member 2 with ease in a direction of moving away from the disk 12.

As is apparent from the above description, according to the above described embodiment of the present invention, even when an ambient temperature rises, or even when a temperature of the element is increased by writing and reading, it is possible to maintain a fixed and proper temperature of the element by changing voltage or current applied to the electric conducting films. By maintaining a proper and fixed spacing between the element and the writing medium, it is possible to prevent damage on the head element and an abnormal signal resulted from the formation of thermal asperity without causing the head element to collide with the small protrusions on the surface of the magnetic disk.

Further, when the element has a low temperature, voltage or current is applied to the electric conducting films and heat is generated on the electric conducting films so as to maintain a fixed and proper temperature of the element. Thus, a proper and fixed spacing is maintained between the element and the writing medium so as to prevent a writing/reading error at low temperature.

As described above, according to the present invention, it is possible to provide a magnetic disk device or a magnetic head slider, by which collision can be prevented between the head element and the small protrusions on the surface of the magnetic disk even when a temperature increases, and damage on the head element and thermal asperity can be reduced.

Moreover, it is possible to provide a magnetic disk device which can perform normal writing and reading in response to changes in ambient temperature such as a temperature in the magnetic disk device and an outside air temperature.

What is claimed is:

1. A magnetic head slider comprising:
   a head element which records or reproduces information on a magnetic disk,
   a slider having said head element, and
   an electric conducting film formed to be serpentine layout having a plurality of cut lines from opposite directions, where current flows in the opposite direction across said cut lines.

2. A magnetic head slider according to claim 1, wherein said electric conducting film is formed on both sides of said head element from an inlet end of said slider to an outlet thereof.

3. A magnetic head slider according to claim 1, wherein an insulating film is formed between said slider and said electric conducting film.

4. A magnetic head slider according to claim 1, wherein said electric conducting film has a width dimension greater than a width of said head element.

5. A magnetic head slider according to claim 1, wherein a common current flows through said first and second parts, such that opposing current flows within opposing ones of the first and second parts are substantially equal to one another.

6. A magnetic disk device comprising:
   a magnetic disk,
   a magnetic head slider having a head element which records or reproduces information on said magnetic disk, and
   a positioning system for positioning said magnetic head slider on said magnetic disk,
   said magnetic head slider including an electric conducting film formed to be serpentine layout having a plurality of cut lines from opposite directions, where current flows in the opposite direction across said cut lines.

7. A magnetic disk device according to claim 6, wherein said electric conducting film is formed on both sides of said head element from an inlet end of said slider to an outlet thereof.

8. A magnetic disk device according to claim 6, wherein an insulating film is formed between said slider and said electric conducting film.

9. A magnetic disk device according to claim 6, wherein said electric conducting film has a width dimension greater than a width of said head element.

10. A magnetic disk devices according to claim 6, wherein a common current flows through said first and second parts, such that opposing current flows within opposing ones of the first and second parts are substantially equal to one another.

* * * * *

UNITED STATES PATENT AND TRADEMARK OFFICE
CERTIFICATE OF CORRECTION

PATENT NO. : 7,474,504 B2
APPLICATION NO. : 11/256965
DATED : January 6, 2009
INVENTOR(S) : Xu et al.

It is certified that error appears in the above-identified patent and that said Letters Patent is hereby corrected as shown below:

Title Page, Item (73) Assignee should read

(73) Assignee: Hitachi Global Storage Technologies Japan, Ltd., Kanagawa (JP)

Signed and Sealed this

Third Day of August, 2010

David J. Kappos
*Director of the United States Patent and Trademark Office*